United States Patent [19]

Hansen

[11] Patent Number: 4,760,294
[45] Date of Patent: Jul. 26, 1988

[54] LINEAR MOTOR WITH INDEPENDENTLY CONTROLLED COILS

[76] Inventor: Thomas C. Hansen, 19 Wooddale, Petaluma, Calif. 94952

[21] Appl. No.: 906,699

[22] Filed: Sep. 11, 1986

Related U.S. Application Data

[60] Continuation of Ser. No. 747,028, Jun. 20, 1985, abandoned, which is a continuation-in-part of Ser. No. 643,746, Aug. 23, 1984, abandoned, which is a division of Ser. No. 521,975, Aug. 11, 1983, abandoned, which is a continuation of Ser. No. 417,222, Sep. 13, 1982, Pat. No. 4,509,109.

[51] Int. Cl.$^4$ ............................................. H02P 7/06
[52] U.S. Cl. .............................. 310/13; 310/DIG. 6; 318/135
[58] Field of Search .................................... 310/12–14, 310/208, 254, DIG. 6; 318/135

[56] References Cited

U.S. PATENT DOCUMENTS

| | | | |
|---|---|---|---|
| 3,135,880 | 6/1964 | Olson et al. | 310/14 |
| 3,543,060 | 11/1970 | Holmes et al. | 310/13 |
| 3,581,127 | 5/1971 | Warnett | 310/13 |
| 3,602,745 | 8/1971 | Davis | 310/13 |
| 4,024,552 | 5/1977 | Kondo | 310/13 X |
| 4,051,398 | 9/1977 | Kondo | 310/12 |
| 4,079,400 | 3/1978 | Kondo | 310/13 X |
| 4,187,453 | 2/1980 | Rough | 310/12 X |
| 4,215,283 | 7/1980 | Hinds | 310/14 |
| 4,509,109 | 4/1985 | Hansen | 310/14 |
| 4,528,484 | 7/1985 | Hansen | 310/13 |
| 4,543,615 | 9/1985 | van Campenhout et al. | 310/13 |
| 4,658,162 | 4/1987 | Koyama et al. | 310/68 R |

*Primary Examiner*—Patrick R. Salce
*Assistant Examiner*—D. L. Rebsch
*Attorney, Agent, or Firm*—Flehr, Hohbach, Test, Albritton & Herbert

[57] ABSTRACT

Linear motor having a plurality of individually energizable coils along an axis. An armature member moves along the axis, and the coils are selectively energized to position the armature member along the axis. The motor is constructed in modular form and can be extended to any desired length by adding coil units and switching elements.

15 Claims, 8 Drawing Sheets

LINEAR MOTOR WITH INDEPENDENTLY CONTROLLED COILS

This is a continuation of application Ser. No. 747,028 filed June 20, 1985, now abandoned, which is a continuation-in-part of Ser. No. 643,746, filed Aug. 23, 1984, which is a division of Ser. No. 521,975, filed Aug. 11, 1983, all now abandoned, which is a continuation of Ser. No. 417,222, filed Sept. 13, 1982, now U.S. Pat. No. 4,509,109. Related subject matter is also disclosed in copending Ser. No. 467,137, filed Feb. 16, 1983, now U.S. Pat. No. 4,528,484.

This invention pertains generally to electrical coils and motors, and more particularly to a linear motor which can be constructed in modular form.

In linear motors, an armature is moved in a linear direction by interaction of magnetic forces between the armature and a stationary stator structure. In a loudspeaker, for example, movement of the speaker cone is produced by interaction of the magnetic fields produced by a permanent magnet and a voice coil which is energized with signals corresponding to the sound to be produced. A solenoid is another example of a linear motor in which an armature is moved axially of a coil by energization of the coil. With devices having a single coil, only a limited amount of movement is possible.

Heretofore, there have been some attempts to achieve greater movement in linear motors by positioning a plurality of coils along an axis. The coils are generally connected electrically in series and energized with a polyphase current to produce a traveling magnetic field. Such motors have certain limitations and disadvantages in that the speed at which the field, and hence the armature, travels can be controlled only by changing the frequency of the energizing current or by changing the poles of the motor. Frequency changing is generally not practical, and pole changing requires elaborate switching or rewiring to change the interconnection of the coils or the use of additional windings to produce a different speed. With such structures it is not possible to control the position of the armature, but only the speed at which it travels. Since all of the coils are energized at once, a substantial amount of energy is wasted in energizing coils which are too far from the armature to have any effect on it at the time.

In the linear motors heretofore provided, individual control of a plurality of armatures has not been possible. When the stator coils are energized, all of the armatures move at once. If the armatures are all loaded equally, they all move at the same rate. However, if they are loaded unequally, they move at different rates and may even collide with each other.

It is in general an object of the invention to provide a new and improved linear motor.

Another object of the invention is to provide a linear motor which overcomes the limitations and disadvantages of linear motors heretofore provided.

Another object of the invention is to provide a linear motor of the above character which can be constructed in modular form.

These and other objects are achieved in accordance with the invention by providing a linear motor having a plurality of independently energizable coils positioned along an axis, an armature member movable along the axis, and means including independently controlled elements connected to the coils for selectively energizing the coils individually or in groups to produce a magnetic field which interacts with the armature member to position the armature member along the axis.

Figure 1:
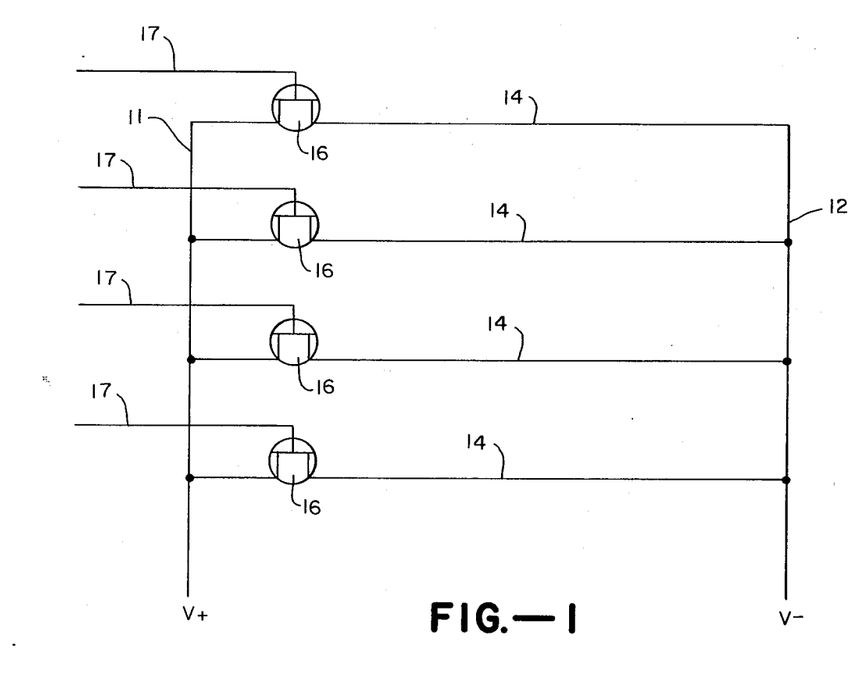
FIG. 1 is a circuit diagram of one embodiment of an electrically controlled coil assembly which can be utilized in a linear motor incorporating the invention.

The coil assembly illustrated in FIG. 1 comprises a pair of electrically conductive buses 11, 12 which are connected to a source (+V, −V) of electrical energy. Although shown as a DC motor, AC may also be used to create an induction motor. A plurality of electrical conductors 14 are connected electrically in parallel between the buses to form the windings of a coil, and electronic control elements 16 are connected electrically in series with the individual conductors to control the energization thereof. In the embodiment illustrated, the control elements comprise field effect transistors, and control signals are applied to the control gates of the field effect transistors. However, it will be understood that any other suitable control elements can be employed if desired. The conductors 14 which form the coil windings are arranged electrically in parallel on a suitable substrate or substrates, not shown in this figure, such as printed circuit boards or a semiconductor body.

The number and manner in which the coil windings are energized or connected into a circuit is controlled by signals applied via control lines 17 to the control inputs of control elements 16. The control signals may be analog or digital signals. These elements can be turned on or rendered conductive individually or in any desired group or groups and in any desired sequence, such as a sequential linear progression, by the application of suitable control signals.

Figure 2:
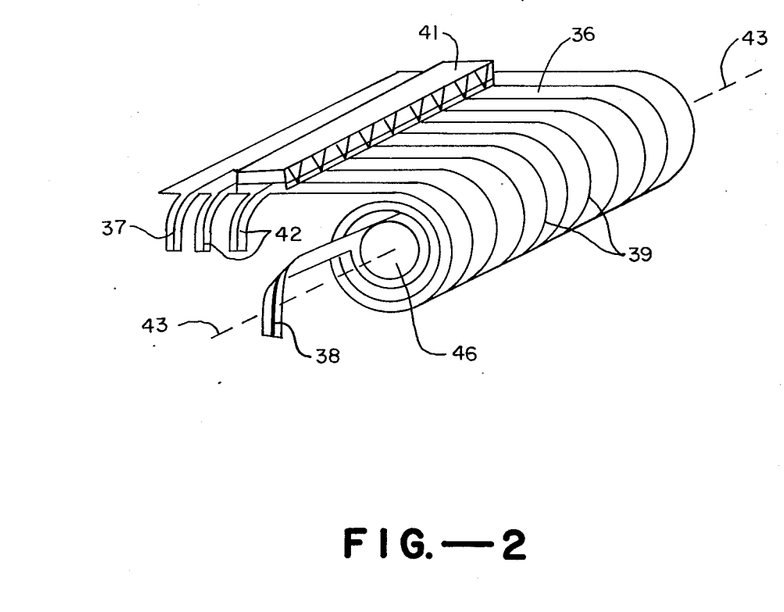
FIG. 2 is an isometric view, somewhat schematic, of one embodiment of a linear motor incorporating the invention.

FIG. 2 illustrates a linear motor having a coil structure similar to that illustrated in FIG. 1. This motor includes a substrate 36 which comprises a flexible, generally rectangular printed circuit board with electrically conductive buses 37, 38 extending in a lateral direction near the ends of the board for connection to a source of electrical energy. The electrically conductive buses may also be located off the printed circuit board. A plurality of electrical conductors 39 extend longitudinally of the board between the buses in spaced parallel relation to form the windings of a coil, and control elements 41 are connected electrically in series with the conductors toward one end of the board, to control the energization of the windings. The control elements can also be located remotely from the substrate. Control lines 42 extend laterally of the board and carry control signals to the control elements. Buses 37, 38, conductors 39 and control lines 42 are formed by a conductive metal foil on the flexible substrate.

Circuit board 36 is wrapped in spiral fashion about an axis 43 which extends in a direction generally perpendicular to the length of conductors 39, with the conductors encircling the axis and control elements 41 being positioned toward the outer end of the wrapped structure. In this embodiment, the magnetic field produced by the coil assembly is directed along axis 43 in the manner of a conventional helically wound coil, but the individual windings can be selectively energized to produce a magnetic field which moves along the axis in any desired manner.

A magnetically polarized armature 46 is positioned within the wrapped coil assembly for movement along axis 43 in response to energization of the coil windings. The position of the armature and the manner in which it moves are determined by the manner in which the coil windings are energized, i.e., by the control signals applied to the control elements. The current in each coil can be adjusted with respect to the current in adjacent coils to provide fine control of the armature position.

The magnetically polarized portions of the armature may include a permanent magnet, an electromagnet or an induced magnetic dipole. More than one polarized portion may be on a single armature.

Figure 3:
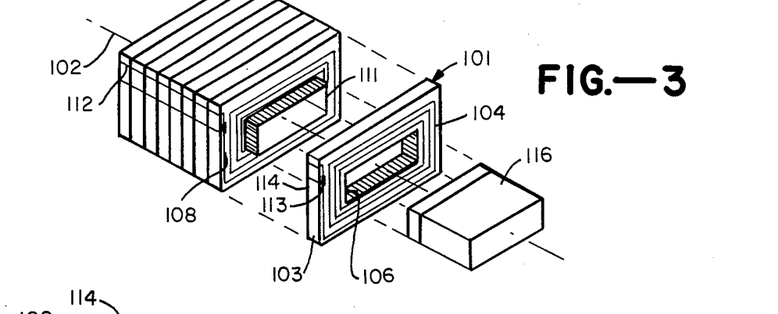
FIG. 3 is an exploded isometric view of another embodiment of a linear motor incorporating the invention.

The motor of FIG. 3 comprises a plurality of modular coil units 101 which are stacked together along a linearly extending axis 102. Each of the coil units comprises a generally planar substrate 103 which carries an electrically conductive winding 104. Each winding comprises an elongated electrical conductor wrapped in spiral fashion about a central opening 106 in the substrate. The winding has an inner end 107 adjacent to the central opening, and an outer end 108 adjacent to a peripheral edge of the substrate. The substrates are fabricated of an electrically insulative material, with each of the windings 104 lying generally in a plane on one face of the substrate. The substrates can be of any suitable dimensions for a particular application. The coil units are stacked together with the winding on each substrate facing in the same direction and the substrates themselves serving as insulators between the windings on adjacent substrates.

In the embodiment of FIG. 3, substrates 103 and openings 106 are generally rectangular, and the spiral path of winding 104 is likewise generally rectangular. It will be understood, however, that any one or more of these elements can have any other suitable contour, e.g. circular.

A sleeve 111 of electrically conductive material extends through the openings of the coil units and is connected electrically to the inner ends 107 of windings 104. In one presently preferred embodiment, the windings are formed by electrically conductive foil formed in a spiral shaped pattern on the face of each substrate, with a portion of the foil extending around the corner into opening 106 where it is soldered to conductive sleeve 111. Thus, sleeve 111 serves to connect the inner ends of the windings together for connection to one terminal of a source of electrical energy (not shown).

The outer ends 108 of windings 104 are connected to an electrically conductive bus 112 which extends longitudinally along one side of the stacked coil units and is connected to the second terminal of the source of electrical energy.

Means is provided for selectively controlling the energization of windings 104. This means includes an electrically controlled switching device 113 connected electrically in series with the outer end 108 of each of the windings and positioned toward the peripheral edge of each substrate. A control line 114 is formed on the edge of the substrate and connected to the switching device for carrying electrical signals to control the conductivity of the device.

A magnetically polarized armature 116 is slidably mounted within sleeve 111 for movement along axis 102 in response to energization of the coil windings. As in the embodiment of FIG. 2, the position of the armature and the manner in which it moves are determined by the manner in which the coil windings are energized, i.e. by the control signals applied to the control elements.

It can be noted that the embodiment of FIG. 3 is electrically similar to the embodiment of FIG. 2 in that a plurality of generally planar spirally wrapped windings which can be selectively energized are positioned side by side along an axis. The two embodiments differ, however, in the manner in which the windings are carried by their respective substrates. In FIG. 2, all of the windings are carried by a single substrate, whereas in FIG. 3 each winding has its own substrate. In the embodiment of FIG. 3, the number of windings is determined by the number of coil units, and motors of different sizes are provided simply by utilizing different numbers of coil units.

Figure 4:
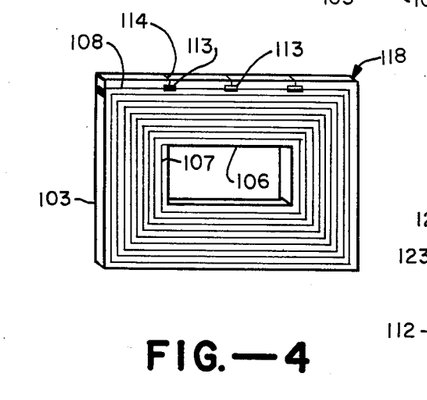
FIG. 4 is an oblique projection of a coil assembly for use in a motor similar to the embodiment of FIG. 3.
Figure 5:
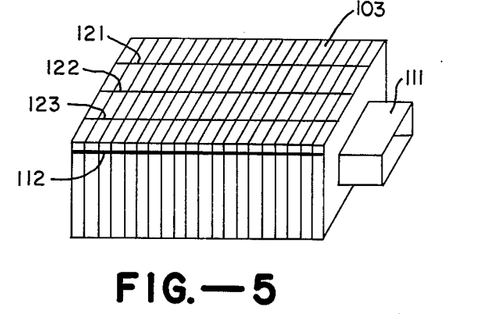
FIG. 5 is an oblique projection of an embodiment of a linear motor utilizing the coil assembly of FIG. 4.

FIG. 4 illustrates a coil assembly 118 which is generally similar to the coil unit 101 of FIG. 3, and like reference numerals designate corresponding elements in the two figures. FIG. 5 illustrates a motor which utilizes this coil assembly. In these embodiments, switching devices 113 are located in different positions along one edge of the substrate in different coil units. The switching devices are located in similar positions for coil units which are to be energized together, and in the motor of FIG. 5, control lines 121-123 extend along one side of the stack of coil units and carry control signals to the switching devices in the respective groups. While only three control lines and three groups of switching devices are illustrated in the drawings, any suitable number of control lines and groups can be provided.

Figure 6:
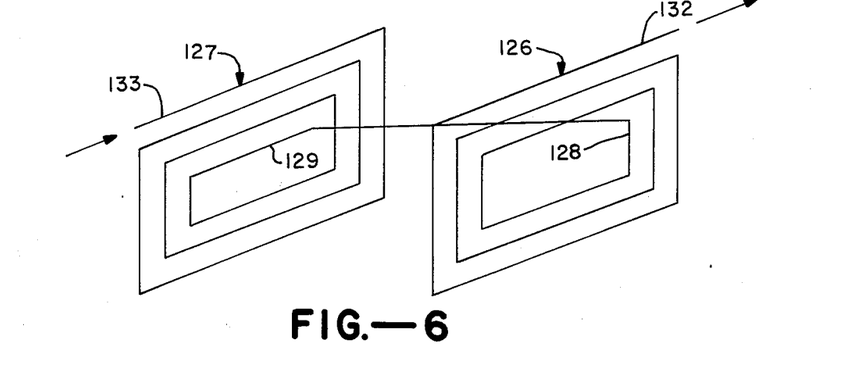
FIG. 6 is a schematic illustration of another embodiment of a coil assembly which can be utilized in the motor of FIG. 3.

FIG. 6 illustrates a winding configuration which can be utilized in the motors of FIGS. 3 and 5. In this embodiment, the winding is formed in two sections 126, 127 on opposite sides of the substrate. Each section comprises an elongated electrical conductor wrapped in spiral fashion in a manner similar to windings 104. The inner ends 128, 129 are connected electrically together to form a single continuous winding, both ends 132, 133 of which are located toward the periphery of the substrate. In one presently preferred embodiment, the winding sections are formed as electrically conductive foils on opposite faces of the substrate, and the inner ends of the sections are connected together by a plated-through opening in the substrate.

Winding sections 126, 127 are of opposite sense in that they are wound in opposite directions, as viewed from one side of the substrate. Thus, for example, in the embodiment of FIG. 6, section 126 is wound in a counterclockwise direction, and section 127 is wound in a clockwise direction when viewed from the side of the substrate on which section 126 is wound. With this winding configuration, both ends of the winding are accessible at the outer edge of the substrate, and the magnetic fields produced by the two winding sections reinforce each other along the axis of the coil assembly.

Figure 7:
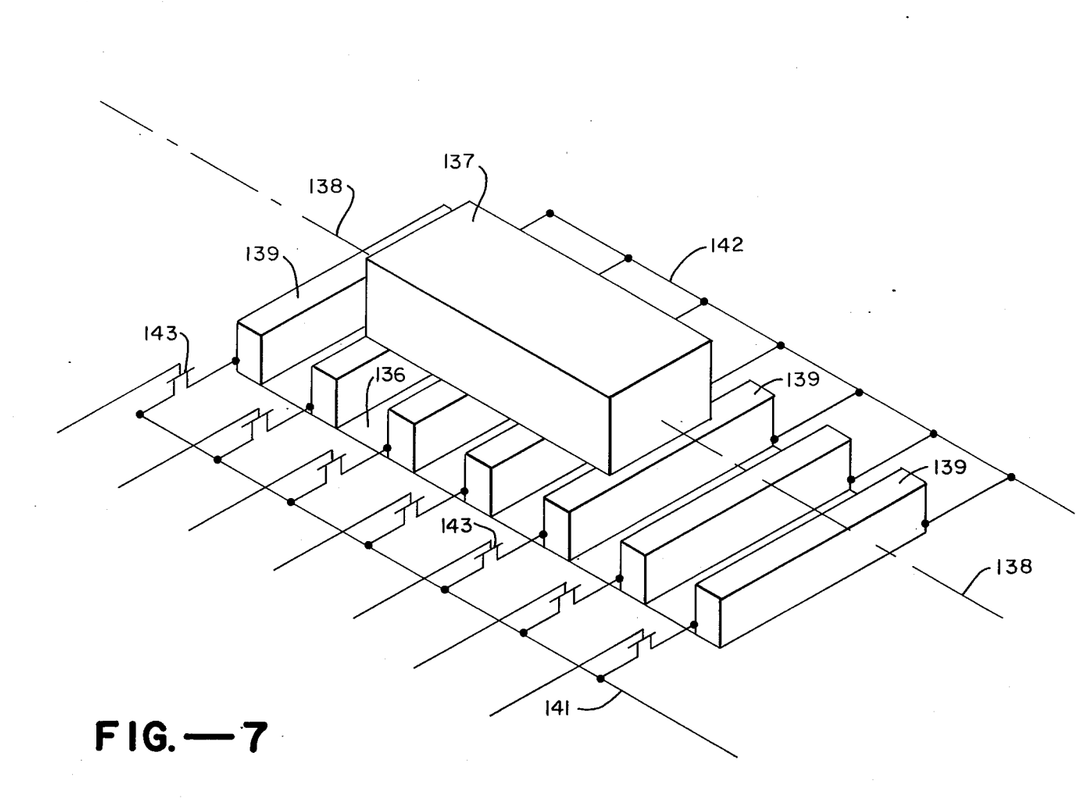
FIG. 7 is an isometric view, somewhat schematic, of another embodiment of a linear motor according to the invention.

In the embodiment of FIG. 7, the motor has a horizontally extending base or substrate 136 and a magnetically polarized armature 137 which moves along a horizontally extending axis 138 above the substrate. A plurality of independently energizable coils 139 are mounted on the substrate and spaced along the axis. Electrically energized buses 141, 142 extend along opposite sides of the substrate, and switching elements 143 are connected electrically in series between the coil windings and the buses to control the energization of the windings. The windings can be energized individually or in groups to move the armature member along the axis and position it as desired.

Figure 8:
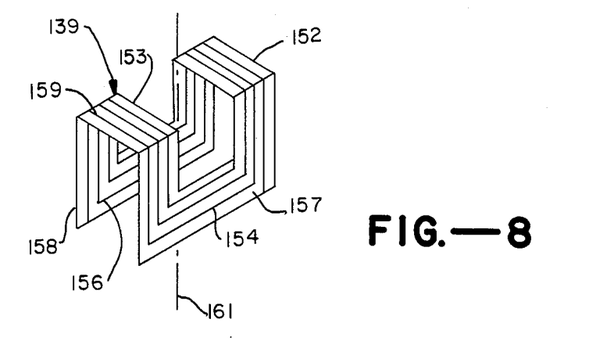
FIG. 8 is an isometric view of an embodiment of a coil assembly which can be utilized in the motor of FIG. 7.

As illustrated in FIG. 8, each of the coils 139 is generally similar to the coil unit 101 of FIG. 3. It comprises a generally rectangular substrate 152 having a rectangular central opening 153, with windings 154, 156 extending in spiral fashion around the opening on opposite sides of the substrate. The side portions 157, 158 of the substrate and the portions of the windings carried thereby are folded down at right angles to the central portion 159 of the substrate and are generally parallel to the central axis 161 of the windings. With the windings folded in this manner, the magnetic flux produced by energization of the windings is concentrated to form a magnetic pole along axis 161. When coil assemblies 139 are stacked along axis 138, winding axes 161 are oriented vertically and at generally right angles to axis 138. Coil assemblies of this type can be stacked for a motor of any desired length, and the motor constructed in this fashion is particularly suitable for an electrically powered automotive system in which the coils and substrate form an energized rail and the armature member is connected to a vehicle which moves along the rail. A plurality of vehicles, each having its own armature member, can travel along different portions of the rail at the same time with energization of the coils in the different portions of the rail being controlled separately to control movement of the different vehicles.

Figure 9:
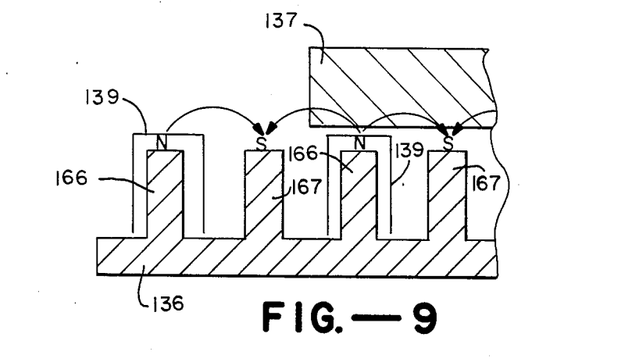
FIG. 9 is a fragmentary cross-sectional view of another embodiment of a motor similar to the embodiment of FIG. 7.

The embodiment illustrated in FIG. 9 is generally similar to the embodiment of FIG. 7, and like reference numerals designate corresponding elements in the two figures. In the embodiment of FIG. 9, however, the substrate 136 is fabricated of a material of high magnetic permeability with a plurality of upstanding pole pieces 166, 167 extending transversely within and between the U-shaped coil assemblies. The magnetic field produced by the coils is concentrated in the pole pieces, and magnetic poles of opposite polarities are formed at the upper sides of the pole pieces between and within the coils. The magnetic field which moves the armature member is thus concentrated near the axis, and this arrangement can serve to levitate the armature member.

Figure 10:
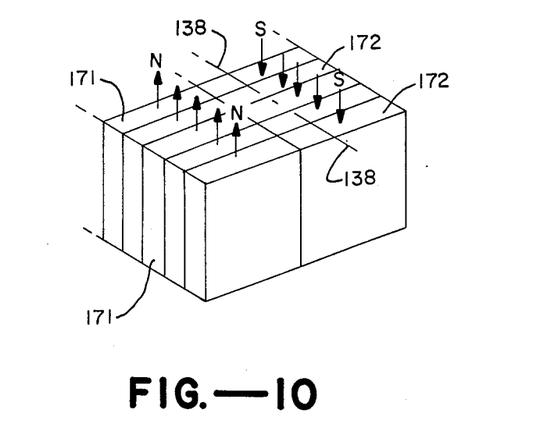
FIG. 10 is an oblique projection, somewhat schematic, of another embodiment of a coil assembly which can be utilized in the motor of FIG. 7.

FIG. 10 illustrates a coil structure for the motor of FIG. 7 in which coils 171, 172 are arranged in pairs positioned side by side along the axis. Each of these coils is generally similar to coil 139, with the windings for the two coils in each pair being positioned side by side on a single substrate. As illustrated, the two coils on each substrate are arranged and energized to provide oppositely oriented magnetic poles. However, the coils can be arranged and energized to provide any desired pattern of magnetic poles.

Figure 11:
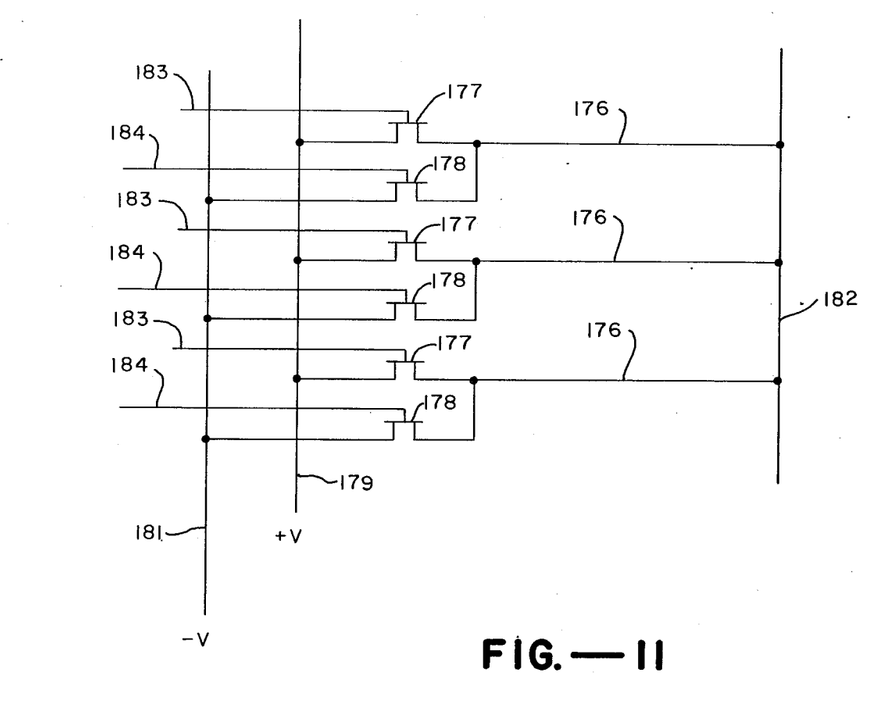
FIG. 11 is a circuit diagram of a control circuit for use in a linear motor incorporating the invention.

The control circuit illustrated in FIG. 11 can be employed in any of the embodiments of the motor heretofore described to control the direction of the current flowing in the stator coils. In this embodiment, the energization of each of the stator coils 176 is controlled by a pair of control elements 177, 178 such as field effect transistors. Elements 177 are connected electrically in series between a first end of the winding and an electrically conductive bus 179 which is connected to the positive terminal (+V) of a voltage source. Elements 178 are connected electrically in series between the first ends of the windings and a bus 181 connected to the negative terminal (−V) of the voltage source. The other ends of the windings are connected together by a bus 182, and control signals are applied to the respective control elements via control lines 183, 184.

Depending upon the signals applied to control lines 183, 184, any of the windings 176 can be energized with a current of either polarity. With this arrangement, it is possible to balance the magnetic fields produced by the coils so that the interacting fields of the stator and the armature position the armature in the stator field rather than repelling the armature out of the stator field.

Figure 12:
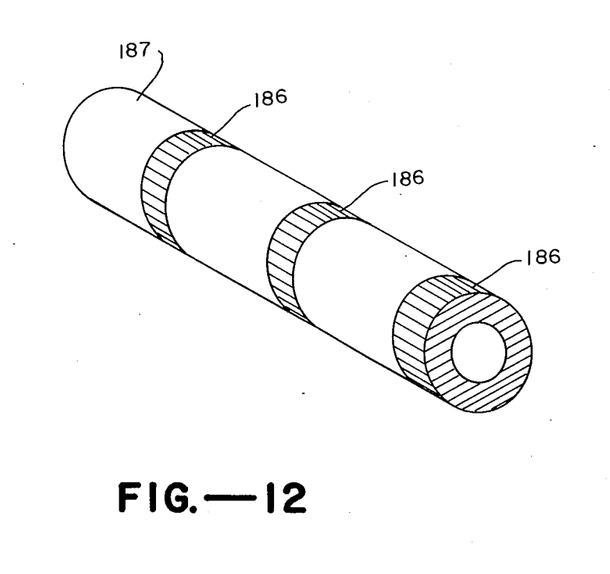
FIG. 12 is an isometric view, somewhat schematic, of an armature structure for use in a linear motor incorporating the invention.

FIG. 12 illustrates an armature structure having a plurality of axially spaced apart electrically conductive rings 186. The body 187 of the armature between the conductive rings is fabricated of a magnetically permeable material. This armature structure can be employed in any of the embodiments of the linear motor heretofore described if the stator coils are energized with an alternating current. The alternating fields produced by the stator coils induce a current in the conductive rings which produces a magnetic field opposite to the field produced by the stator coils. These fields interact to position the stator where the combined magnetic fields are at the lowest potential. If the stator coils are energized sequentially with the alternating current, the armature will move in accordance with the traveling stator field.

Figure 13:
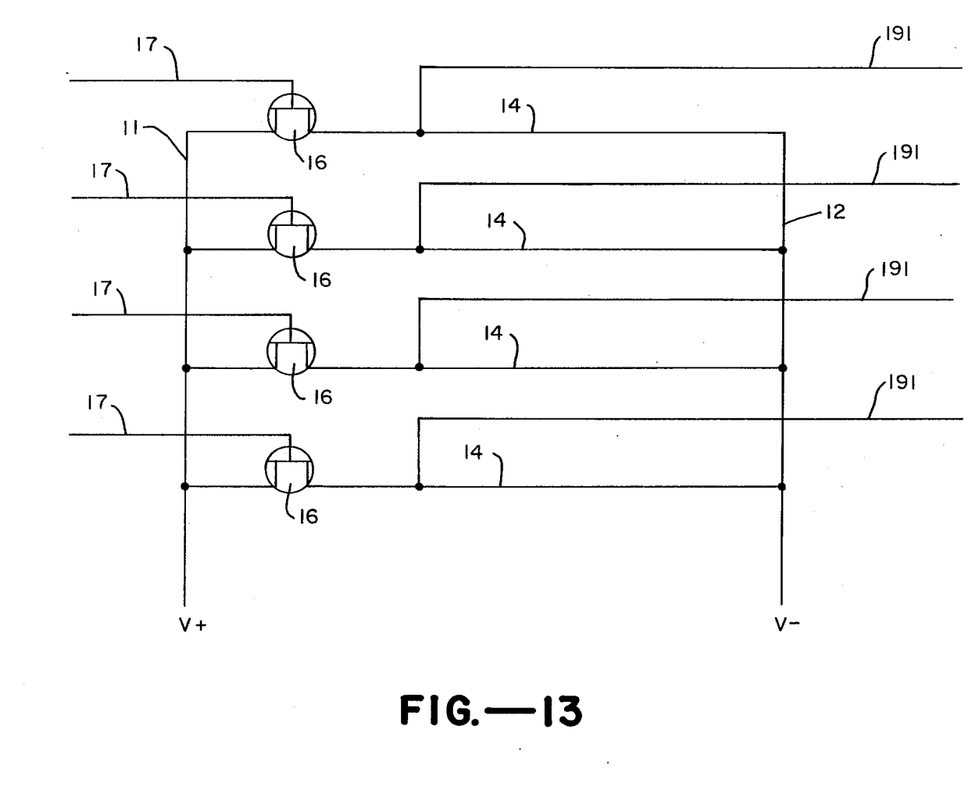
FIG. 13 is a circuit diagram of a stator coil and control circuit for use in a linear motor according to the invention.

FIG. 13 illustrates the addition of sensing lines 191 to the stator coils of the motor. The coil circuit illustrated in this figure is similar to the coil circuit of FIG. 1, and like reference numerals designate corresponding elements in the two figures. The sensing conductors are connected electrically to windings 14 at a convenient location near control elements 16. Suitable monitoring devices can be connected to the sensing lines to monitor conditions in the windings, e.g. short-circuits or open circuits. While monitoring conditions in the coils, it is also possible to determine the position of the armature. Information signals can also be injected into or received from the stator coils by via lines 191 to permit information to be transferred between the stator and the armature. Lines 191 can also be employed to check the status of control devices 16.

As a method to remove heat from the motor, heat conductive strips of material may be inserted into the coils during the manufacturing process. If metallic strips of material were used such as copper, these could be arrayed at right angles to the electrical conductors, and interspersed in the layers of the coils. These strips of material would then conduct the heat from the interior of the motor to the air around the motor, or may be attached to, or be a part of a moving fluid cooling system.

It is apparent from the foregoing that a new and improved linear motor has been provided. While only certain presently preferred embodiments have been described, as will be apparent to those familiar with the art, certain changes and modifications can be made without departing from the scope of the invention as defined by the following claims.

What is claimed:

1. In a linear motor: a plurality of independently energizible windings having openings aligned along an axis, an armature member movable along said axis and through the openings in said windings, and positioning means including independently controlled elements connected to said windings for selectively energizing said windings to produce a magnetic field which interacts with said armature member to position said armature member along said axis, said positioning means further including means for activating any selected one or combination of said independently controlled elements so that said armature member can be statically positioned at any selected position along said axis.

2. In a linear motor: an armature member movable along a longitudinal axis, a plurality of independently energizable coils spaced along the axis, each of said coils comprising an electrical conductor around a coil axis which is generally perpendicular to the longitudinal axis, and positioning means including independently controlled elements connected to the coils for selectively energizing the coils to produce a magnetic field which interacts with the armature member to position the armature member along the longitudinal axis, said positioning means further including means for activating any selected one or combination of said independently controlled elements so that said armature member can be statically positioned at any selected position along said axis.

3. The motor of claim 2, wherein said coils are mounted on separate substrates stacked along said longitudinal axis so that any selected one of said coils can be replaced without removing or replacing any of said other coils.

4. In the motor of claim 2, sensor means coupled to a multiplicity of said coils for monitoring conditions in said coils.

5. In a linear motor: an armature member movable along a longitudinal axis, a plurality of independently energizable coils spaced along the axis, each of said coils comprising an elongated electrical conductor wound about a coil axis which is generally perpendicular to the longitudinal axis and folded to a U-shaped configuration with said portions generally parallel to the coil axis, and positioning means including independently controlled elements connected to the coils for selectively energizing the coils to produce a magnetic field which interacts with the armature member to position the armature member along the longitudinal axis, said positioning means further including means for activating any selected one or combination of said independently controlled elements so that said armature member can be statically positioned at any selected position along said axis.

6. The motor of claim 5 wherein the coils are arranged in pairs spaced side by side along the longitudinal axis.

7. In a linear motor: a plurality of generally planar substrates stacked face to face along an axis and having central openings therein, elongated electrical conductors carried by the substrates and wound about the openings to form a plurality of independently energizable windings, an armature member movable along the axis and through the openings in the substrates, and positioning means including independently controlled elements connected to the conductors for selectively energizing the conductors to produce a magnetic field which interacts with the armature member to position the armature member along the axis, said positioning means further including means for activating any selected one or combination of said independently controlled elements so that said armature member can be statically positioned at any selected position along said axis.

8. The motor of claim 7 wherein the independently controlled elements are mounted on the substrates.

9. The motor of claim 5, wherein said means for selectively energizing said coils includes means for selecting the sense of the magnetic field generated by at least a multiplicity of said coils.

10. The motor of claim 5, wherein said coils are mounted on separate substrates stacked along said longitudinal axis so that any selected one of said coils can be replaced without removing or replacing any of said other coils.

11. In the motor of claim 5, sensor means coupled to a multiplicity of said coils for monitoring conditions in said coils.

12. In the motor of claim 2, a plurality of armature members movable along said longitudinal axis, wherein said coils can be selectively energized so as to independently control the position of each said armature member.

13. The motor of claim 2, wherein said means for selectively energizing said coils includes means for selecting the sense of the magnetic field generated by at least a multiplicity of said coils.

14. In the motor of claim 5, a plurality of armature members movable along said longitudinal axis, wherein said coils can be selectively energized so as to independently control the position of each said armature member.

15. The motor of claim 7, wherein said means for selectively energizing conductors includes meane for controlling the magnitude of the magnetic field generated by at least a multiplicity of said coils, thereby allowing said armature member to be statically positioned at any location along a predefined portion of said axis.

* * * * *